United States Patent [19]

Rogemont et al.

[11] Patent Number: 4,701,234
[45] Date of Patent: Oct. 20, 1987

[54] PROCESS FOR THE MANUFACTURE OF AN INTERPOSED SUPPORT OF SEMIPERMEABLE MEMBRANES

[75] Inventors: Jean Rogemont, Saint Chamond; Andre Nouvet, Saint Heand, both of France

[73] Assignee: Cefilac, Paris, France

[21] Appl. No.: 850,114

[22] Filed: Apr. 10, 1986

[51] Int. Cl.$^4$ .................. B44C 1/16; B32B 31/00; B32B 23/02

[52] U.S. Cl. .................. 156/230; 156/246; 156/248; 156/256; 156/298; 428/193

[58] Field of Search ............ 156/230, 231, 232, 239, 156/238, 247, 248, 249, 298, 309.6, 303.1, 329, 256, 246; 428/192, 193, 255, 194, 45; 210/499, 450; 55/524, 28, 502, DIG. 43

[56] References Cited

U.S. PATENT DOCUMENTS

| | | |
|---|---|---|
| 2,663,905 | 12/1953 | Van Riper et al. . |
| 3,537,948 | 11/1970 | Marzocchi ............ 156/329 |
| 3,619,323 | 11/1971 | Stebleton ............ 156/329 |
| 3,679,059 | 7/1972 | Wyatt et al. . |
| 3,987,592 | 10/1976 | Herminghaus et al. ...... 428/192 |
| 4,082,071 | 4/1978 | Jones ................. 55/502 |
| 4,227,953 | 10/1980 | Wasielewski ............ 150/298 |
| 4,264,447 | 4/1981 | Nicolet ................ 428/194 |
| 4,360,433 | 11/1982 | Walker et al. ............ 210/504 |

FOREIGN PATENT DOCUMENTS

| | | |
|---|---|---|
| 45073 | 3/1982 | European Pat. Off. . |
| 1305979 | 7/1973 | United Kingdom . |

Primary Examiner—Donald E. Czaja
Assistant Examiner—Louis Falasco
Attorney, Agent, or Firm—Dennison, Meserole, Pollack & Scheiner

[57] ABSTRACT

The process of the invention concerns the manufacture of an interposed support of semipermeable microfiltration membranes, the support composed of a permeable mesh and a sealed border of elastomeric material. After deposition of an elastomeric film on a transfer support 2, the assembly which is obtained is cut into one or more elements 3 reconstituting the border; this or these elements 3 are applied on the mesh with their support(s) 2 and the elastomer is turned toward the mesh; then the mesh thus equipped is treated with pressure at a temperature of between 100° and 150° C. to cause the elastomer to penetrate into the mesh and to obtain a smooth border surface on each side of this mesh, allowing for a sealed joint. The product which is obtained is applied to the manufacture of microfiltration units, whether it has to do with ultrafiltration, with gas permeation or with hemodialysis.

13 Claims, 5 Drawing Figures

PROCESS FOR THE MANUFACTURE OF AN INTERPOSED SUPPORT OF SEMIPERMEABLE MEMBRANES

The process of the invention concerns the area of microfiltration having to do either with ultrafiltration, gas permeation or hemodialysis, and it more precisely concerns the manufacture of an interposed sealed support which will be placed between the membranes or stacked membrane-like pouches constituting a filtration assembly or unit.

THE PROBLEM

The interposed support consists in a known manner of a permeable mesh, typically of polyamide, having borders of elastomeric material, e.g. silicone, on its periphery.

These borders must play the role of sealing joints, both internal and external, for the stacking of the membrane-like pouches which are mechanically held tightly together. In the internal plan, they surround the orifices corresponding to the orifices of the stacked membrane-like pouches, which orifices serve for the circulation of the fluid to be filtered in these membrane-like pouches and of which the seal is important for the effectiveness and quality of the filtration. On the external plan, the borders must assure the seal both on the two edges of the membrane-like stacked pouches which do not have orifices and on the two edges having the aforementioned orifices.

The traditional techniques of manufacture of such interposed supports result in borders of nonuniform contour and irregular thickness. These supports give a deficient seal for the stacked and tightly held membrane-like pouches, and it is customary to use glue or adhesive for the membrane-like pouches, thus partially obstructing the communication passages and the filtration surfaces.

The problem to be resolved by the invention is to obtain interposed supports having borders which provide the seal without any addition of adhesive, wherein these borders also have a very uniform contour.

STATE OF THE ART

A typical prior art process consists of casting silicone on the polyamide mesh followed by polymerization. The mold is closed at all points only with difficulty and silicon leaks occur into the inside of the mesh. There is also deficiency of planarity and variations of thickness of the borders leading to deficiencies of the seal as aforementioned.

SUMMARY OF THE INVENTION

To realize a uniform and sealed border, according to the invention the casting as replaced by a transfer followed by penetration treatment. The raw elastomer is deformed by the last contact, so a transfer support is used which allows a uniform strip of raw elastomer to be picked up, typically upon its discharge from an extruder, then to be cut according to the designated contour, then to be applied with its support to the permeable mesh, then to penetrate into the mesh, and then the polymerization occurs beween the parallel surfaces and, in a surprising manner, the border which is obtained is continuous and smooth, both on the side of the mesh on which the elastomer has been applied and on the other side. The interposed supports which are obtained then allow manufacture of filtration cassettes or units sealed by simple clamping, without use of adhesive.

More precisely speaking, the process of the invention comprises essentially the following steps in succession:

(a) a film of raw elastomer is deposited on a transfer support;
(b) the assembly which is obtained is then cut into an element which has, concerning the elastomer, the design of the border, or into several elements which realize this design by application of the elements end to end;
(c) this element or these elements are applied on one side of the permeable mesh, and the elastomer material is turned toward the mesh;
(d) the mesh thus arranged is treated with pressure and at a temperature between 100° and 150° C. to cause the elastomer to penetrate into the mesh and to polymerize it, and the regulation (time, temperature) of the treatment is such that a border surface is obtained on each side of the mesh which is perfectly smooth, allowing a sealed joint;
(e) the interposed support of the treatment device is withdrawn and the transfer support (or supports) is detached from the border.

The following preferred embodiments may be utilized in this process, individually or in any of the various possible combinations:

1. The transfer support is a polyester film, of thickness typically between 0.02 and 0.05 mm;
2. The elastomer material is silicone;
3. According to step a) in the process, a film of raw silicone fresh from extrusion and calibrated by this extrusion, is deposited on a polyester film;
4. This film of raw silicone has a uniform thickness of between 0.2 and 0.6 mm, or more preferably between 0.4 and 0.6 mm;
5. The permeable mesh is of polyamide;
6. The mesh provided with raw elastomer element on the transfer support(s) is treated at a temperature between 110 and 130° C. for 1 to 5 minutes with pressure. In the case of silicone elements, the pressure should be at least about 5.5 Kg/Cm$^2$ (0.54 MPa; 78 PSI) and preferably, is from about 6.5 to 14 Kg/Cm$^2$ (0.64–1.37 MPa; 93–198 PSI) and more preferably from about 9 to 13 Kg/Cm$^2$ (0.88 to 1.27 MPa; 128 to 184 PSI). Pressure which is too low can result in a failure of the elastomer to penetrate into the mesh, while pressure which is too high can cause widening of the border, with the resultant support being out of tolerances.

The pressure and temperature treatment (step d) can be effected between two parallel plates. If these are metal plates, the bottom of the mesh will preferably be protected, on the side not covered with elastomer, at the beginning of the operation, for example by a teflon cover or a polyester film, to avoid adherence of the elastomer to the bottom plate at the end of the treatment. The top side of the elastomer border itself is protected from adherence, by its transfer support, which will be detached easily from the border after treatment (step e).

It is also possible to envision use of a calendering device to realize the application of the elastomer film on the mesh, followed by its penetration and its polymerization. The penetration of the elastomer into the mesh by pressure is accomplished by clamping together the cylinders between which the mesh is being moved continuously. The lengthwise borders are realized in one operation, the time and temperature conditions necessary for the polymerization being realized by the calendering device. The transverse borders are then realized on return, by depositing the transverse elements and completing the sealed border and by again treating the mesh with pressure and temperature, without harm to the already polymerized borders.

The return action is accomplished either by applying the transverse borders on the mesh followed by a treatment between two parallel plates, or by means of a calendering device which can be the same device.

The process at least partially using a calendering device allows the realization of either interposed supports of great length, or interposed supports manufactured in mass production.

The elastomer films which are deposited beforehand on transfer supports can be interrupted to allow cutting into individual mesh members following the first calendering, and insertion into the spaces reserved for transverse border elements.

In comparison with the interposed supports of the prior art, the supports of the invention are distinguished by the design of their borders, of which the uniform contour depends solely upon the tooling of cutting and of which the thickness varies very little and especially in a progressive manner (no local defects), and the total variation of thickness of the border of a support does not exceed 0.05 mm for a total border thickness of between 0.4 and 0.6 mm.

DESCRIPTION OF THE PREFERRED EMBODIMENTS

The preferred embodiments will now be discussed with respect to the following example.

Figure 1:
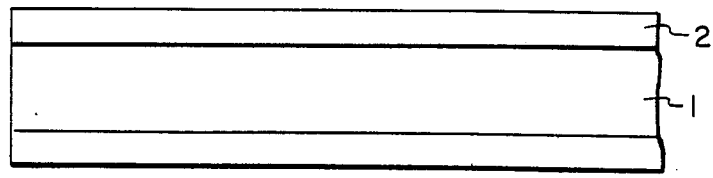
FIG. 1 shows a plan view of a silicone film deposited on a transfer support.

A series of interposed supports has been manufactured from permeable polyamide meshes of 0.3 mm thickness and raw silicone extruded in a strip 1 of 34 mm width and 0.5 mm thickness deposited on a polyester film 2 of greater width, serving as transfer support (FIG. 1).

Such polyamide meshes can only be deformed above 150° C., which will allow application of the heat treatment of the invention to the meshes. The following relates the manufacture of one single interposed support.

Figure 2:
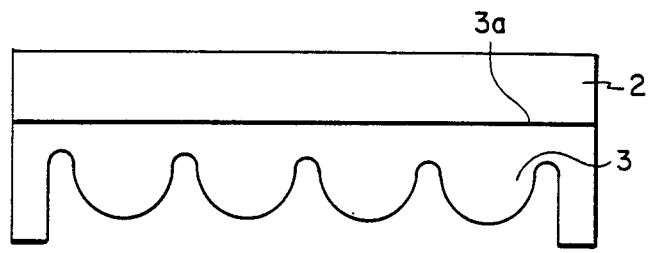
FIG. 2 shows the assembly obtained following cutting, in plan view.

The assembly of the silicone strip and its support film of polyester has been cut into four contiguous elements (FIGS. 2 and 3), by stamping, two transverse elements 3 with internal seal of the orifices corresponding to the orifices of the membrane-like pouches (FIG. 2) and two lengthwise elements 4 serving with the preceding to form the seal around the periphery. Because elements 3 have a rectilinear edge 3a, the edge of the extruded strip 1 has been used without making a new cut, so that the non-covered polyester film 2 continues beyond the edge 3a.

Then, the four elements 3 and 4 were applied (FIG. 3) to a rectangular mesh 5 of dimensions 164×192 mm, pierced beforehand near each transverse edge (edges of 164 mm length) with circular orifices which are uniformly spaced corresponding to the orifices of the membrane-like pouches.

Elements 3 and 4 are contiguous and realize a continuous peripheral border. Their joining lines 6 will disappear after the heat and pressure treatment, with mesh 5 then becoming an interposed support 11 according to the invention.

Figure 3:
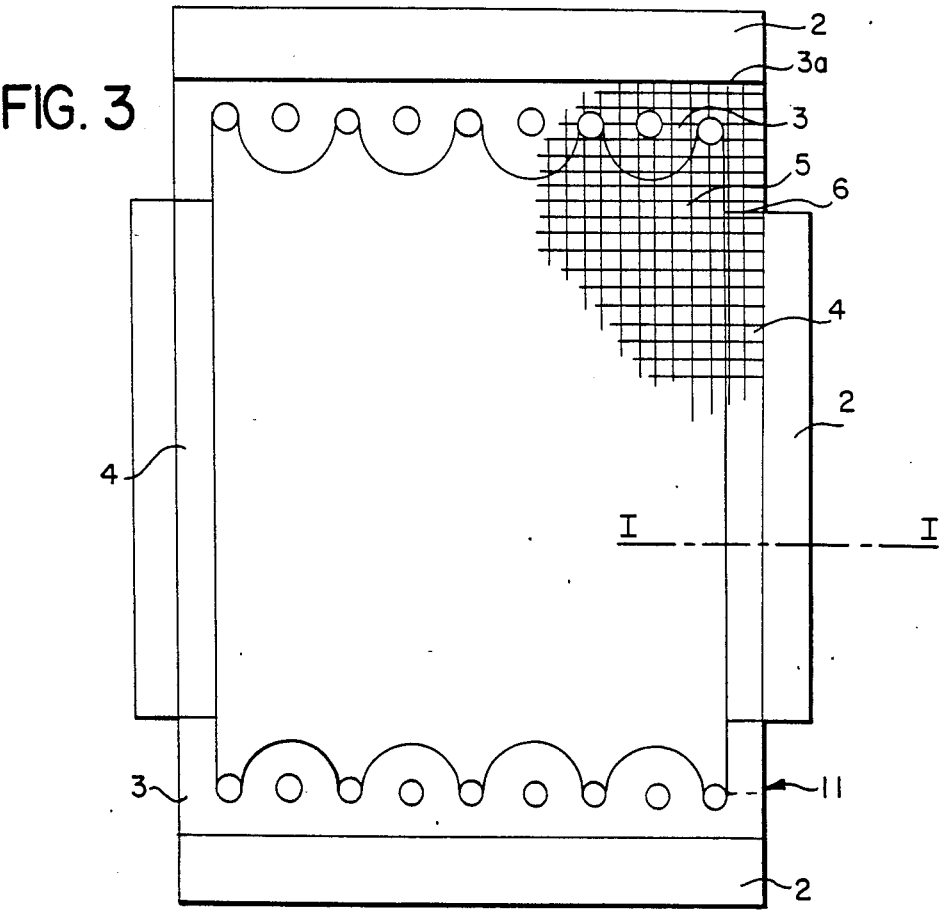
FIG. 3 shows a mesh provided with an elastomeric border, composed of four contiguous elements mounted on their transfer supports, in plan view, as well as the interposed support obtained following the treatment.
Figure 4:
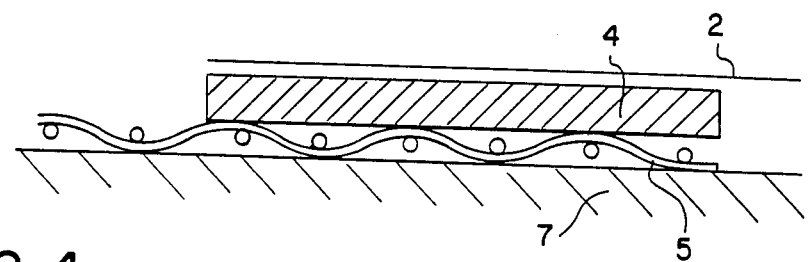
FIG. 4 is a diagram of a stack in transverse section along line I—I of FIG. 3.

FIG. 4 shows in cross-section, the stack arrangement of FIG. 3. A polyamide mesh 5, raw silicone 4, and its polyester film support 2 are provided over the work plane 7, which is extended beyond the silicone 4 toward the outside of mesh 5.

Mesh 5 thus stacked is compressed in a hot compression device with two parallel plates 8 and 9, the bottom of mesh 5 being protected by a cover of a teflon sheet 10.

The compression treatment was applied for 4 minutes at 120° C., at a pressure on the silicone border of 7.0 Kg/Cm$^2$ (0.69 MPa; 100 PSI).

Figure 5:
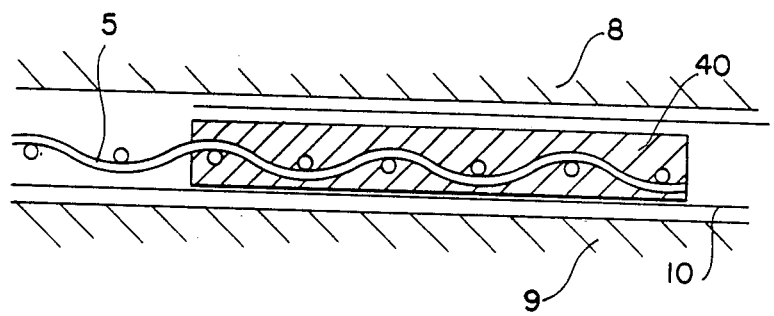
FIG. 5 is a similar diagram, in transverse section, between the two parallel plates of the treatment device, at the end of the treatment.

The product obtained by the treatment is shown in cross-section in FIG. 5. The thickness of the polymerized silicone 40 is practically unchanged (0.5 mm), but about $\frac{1}{3}$ of it is distributed beneath mesh 5 and about $\frac{2}{3}$ above the mesh. The silicone has penetrated continuously into mesh 5, and the top and bottom sides of the silicone border 40 which is obtained are smooth, once polyester films 2 are detached from the polymerized border. The maximum variation of thickness is 0.02 mm.

Ten interposed supports 11 manufactured in same manner were then used to constitute a filtration unit or cassette of 11 membrane-like pouches (0.5 m$^2$ of filtration). Following clamping together and placement in service, without use of adhesive, it was established that there was no leakage.

What is claimed is:

1. Process for the manufacture of an interposed support of semi-permeable membranes, comprising a permeable mesh having a sealed border of elastomeric material, comprising the following steps:
    (a) depositing a raw elastomer film on a transfer support;
    (b) cutting the film on the support into at least one element wherein the elastomer has the configuration of said border;
    (c) applying said at least one element on one side of a permeable mesh, with said elastomer turned toward the mesh;
    (d) treating said at least one element applied to said mesh at a temperature of between 100 and 150° C., at a pressure and for a time sufficient to cause the elastomer to penetrate into the mesh, to polymerize said raw elastomer and to form a border on each side of the mesh which is smooth; and
    (e) removing said transfer support from the polymerized elastomer to produce a support having a border with surfaces that are smooth, continuous, and sealable to the border of another said support without the use of adhesive.

2. Process as in claim 1, wherein the transfer support is a polyester film.

3. Process as in claim 1, wherein the elastomer is silicone.

4. Process as in claim 2, wherein said elastomer is a raw silicone film is deposited in a uniform thickness of between 0.2 and 0.6 mm on said polyester film directly following extrusion of said silicone.

5. Process as in claim 1, wherein the permeable mesh is a polyamide.

6. Process as in claim 1, wherein said at least one element is applied to said mesh at a temperature between 110° and 130° C., for 1 to 5 minutes.

7. Process as in claim 1, 2, 3, 4, 5 or 6, wherein the the treatment of said at least one element applied to said mesh is carried out between two parallel plates.

8. Process as in claim 1, 2, 3, 4, 5 or 6, wherein a pair of parallel elements is applied to said mesh making up a pair of parallel, lengthwise borders, and treated by means of a calendering device, and wherein upon return, a further pair of parallel elements is applied to said mesh making up a pair of parallel, transverse borders, and treated between two parallel plates.

9. Process as in claim 1, 2, 3, 4, 5 or 6, wherein a pair of parallel elements is applied to said mesh making up a pair of parallel, lengthwise borders, and treated by a calendering device, and a pair of parallel elements is applied to said mesh making up a pair of parallel transverse borders, and treated by a calendering device.

10. Process as in claim 1, wherein said film on said support is cut into a plurality of elements which form said border configuration placed end-to-end.

11. Process as in claim 3, wherein said pressure is at least about 5.5 Kg/Cm$^2$.

12. Process as in claim 11, wherein said pressure is from 6.5 to 14 Kg/Cm$^2$.

13. Process as in claim 12, wherein said pressure is from 9 to 13 Kg/Cm$^2$.

* * * * *